United States Patent
Shiohara

(10) Patent No.: US 10,778,893 B2
(45) Date of Patent: Sep. 15, 2020

(54) DETECTION DEVICE, DISPLAY DEVICE AND DETECTION METHOD

(71) Applicant: SEIKO EPSON CORPORATION, Tokyo (JP)

(72) Inventor: Ryuichi Shiohara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/229,511

(22) Filed: Dec. 21, 2018

(65) Prior Publication Data

US 2019/0199927 A1    Jun. 27, 2019

(30) Foreign Application Priority Data

Dec. 22, 2017    (JP) .................. 2017-245838

(51) Int. Cl.
| | |
|---|---|
| *H04N 5/232* | (2006.01) |
| *H04N 5/253* | (2006.01) |
| *H04N 5/235* | (2006.01) |
| *G02B 27/01* | (2006.01) |
| *H04N 5/14* | (2006.01) |
| *H04N 5/353* | (2011.01) |

(52) U.S. Cl.
CPC ....... *H04N 5/23254* (2013.01); *G02B 27/017* (2013.01); *H04N 5/2327* (2013.01); *H04N 5/2329* (2013.01); *H04N 5/2353* (2013.01); *H04N 5/3532* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 9,516,228 B2 * | 12/2016 | Lee | ............... H04N 5/23254 |
| 2005/0256675 A1 | 11/2005 | Kurata | |
| 2007/0242937 A1 | 10/2007 | Sano et al. | |
| 2010/0259471 A1 | 10/2010 | Takano et al. | |
| 2016/0216792 A1 | 7/2016 | Ogawa et al. | |

(Continued)

FOREIGN PATENT DOCUMENTS

| | | |
|---|---|---|
| JP | H11-211480 A | 8/1999 |
| JP | 2003-279882 A | 10/2003 |

(Continued)

*Primary Examiner* — Mark T Monk
(74) *Attorney, Agent, or Firm* — Oliff PLC

(57) ABSTRACT

A detection device, including a first displacement acquisition unit configured to compare an image of an m-th block included in a first frame captured by an area image sensor using a rolling method with an image captured in the m-th block included in a second frame captured after the first frame to acquire displacement of the image with respect to a main scanning direction of the line, a second displacement acquisition unit configured to compare an image of a p-th block included in the first frame with an image captured in the p-th block included in the second frame to acquire displacement of the image with respect to the main scanning direction, and a difference acquisition unit configured to acquire, as a value corresponding to acceleration of the area image sensor, difference between the displacement acquired in the m-th block and the displacement acquired in the p-th block.

8 Claims, 6 Drawing Sheets

(56) References Cited

U.S. PATENT DOCUMENTS

2016/0357017 A1    12/2016  Nishidate et al.
2017/0069103 A1*   3/2017   Gren .................... H04N 5/3535

FOREIGN PATENT DOCUMENTS

| | | |
|---|---|---|
| JP | 2004-085476 A | 3/2004 |
| JP | 2009-141717 A | 6/2009 |
| JP | 2010-074228 A | 4/2010 |
| JP | 2011-139487 A | 7/2011 |
| JP | 2011-205215 A | 10/2011 |
| JP | 2012-169990 A | 9/2012 |
| JP | 2012-222374 A | 11/2012 |
| JP | 2013-083731 A | 5/2013 |
| JP | 2016-52114 A | 4/2016 |
| JP | 2016-066848 A | 4/2016 |
| JP | 2016-149587 A | 8/2016 |
| JP | 2016-224823 A | 12/2016 |
| JP | 2017-127009 A | 7/2017 |

* cited by examiner

DETECTION DEVICE, DISPLAY DEVICE AND DETECTION METHOD

BACKGROUND

1. Technical Field

The present disclosure relates to detection of a value corresponding to acceleration.

2. Related Art

There is known technology for analyzing a change of position of an image captured by an imaging device. For example, JP-A-2016-66848 discloses a configuration in which a rectangular area as a detection target for a motion vector is extracted from an image captured by an imaging device by using template matching and the motion vector is calculated based on a correlation value between frames of the rectangular area.

Generally, a dimension of the motion vector is distance. The dimension can be converted to velocity by the motion vector divided by an inverse of frame rate. Further, the dimension can be converted to acceleration by calculating change of the above described velocity per frame. Typical calculation for obtaining a value having dimensions of acceleration (hereinafter, also referred to as "value corresponding to acceleration"), as described above, is generally performed frame-by-frame.

SUMMARY

In the above described method, it is not possible to calculate a value corresponding to acceleration for a period of time shorter than a time period taken for one frame. Concerning the above, an advantage of some aspects of the present disclosure is to calculate a value corresponding to acceleration at a cycle shorter than the time period taken for one frame.

An embodiment of the present disclosure is a detection device, including an area image sensor configured to capture an image of a subject by using a rolling method in which an image is acquired sequentially from a first block to an n-th (the n is an integer equal to or greater than 2) block on a block-by-block basis, each block including one or more lines, a first displacement acquisition unit configured to compare an image of an m-th (the m is a positive integer equal to or less than the n) block included in a first frame captured by the area image sensor with an image captured in the m-th block included in a second frame captured after the first frame to acquire displacement of the image with respect to a main scanning direction of the line, a second displacement acquisition unit configured to compare an image of a p-th (the p is a positive integer equal to or less than the n and the m≠the p) block included in the first frame with an image captured in the p-th block included in the second frame to acquire displacement of the image with respect to main scanning direction, and a difference acquisition unit configured to acquire, as a value corresponding to acceleration of the area image sensor with respect to the subject, difference between the displacement acquired in the m-th block and the displacement acquired in the p-th block. According to the embodiment, the value corresponding to acceleration can be acquired at a cycle which is shorter than a time period taken for one frame. This is because, in this embodiment, difference of displacement between two blocks is calculated frame-by-frame, and thus, difference of displacement between two blocks in a single frame can be calculated as a value corresponding to acceleration.

In the above described embodiment, the second frame may be a frame next to the first frame. According to the embodiment, time difference between the first frame and the second frame decreases as compared to a case where other frames exist between the first frame and the second frame. Therefore, the value corresponding to acceleration is acquired based on displacement in a short time, and thus the value corresponding to acceleration reflects change of displacement in a short time.

In the above described embodiment, the p may be a value obtained by adding 1 to the m. According to the embodiment, the value corresponding to acceleration is acquired based on the change of displacement in a short time, and thus the value corresponding to acceleration reflects the change of displacement in a short time.

In the above described embodiment, the block may be constituted of a single line. According to the embodiment, the cycle in which the value corresponding to acceleration is acquired is a processing time for a single line.

In the above described embodiment, the first and second displacement acquisition units may be configured to use edge emphasis processing for the comparison. According to the embodiment, the displacement can be detected with high accuracy.

The present disclosure may be implemented in various forms other than the embodiments described above. For example, the present disclosure can be implemented in a form of a display device including the above described detection device, a method performed by the detection device, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
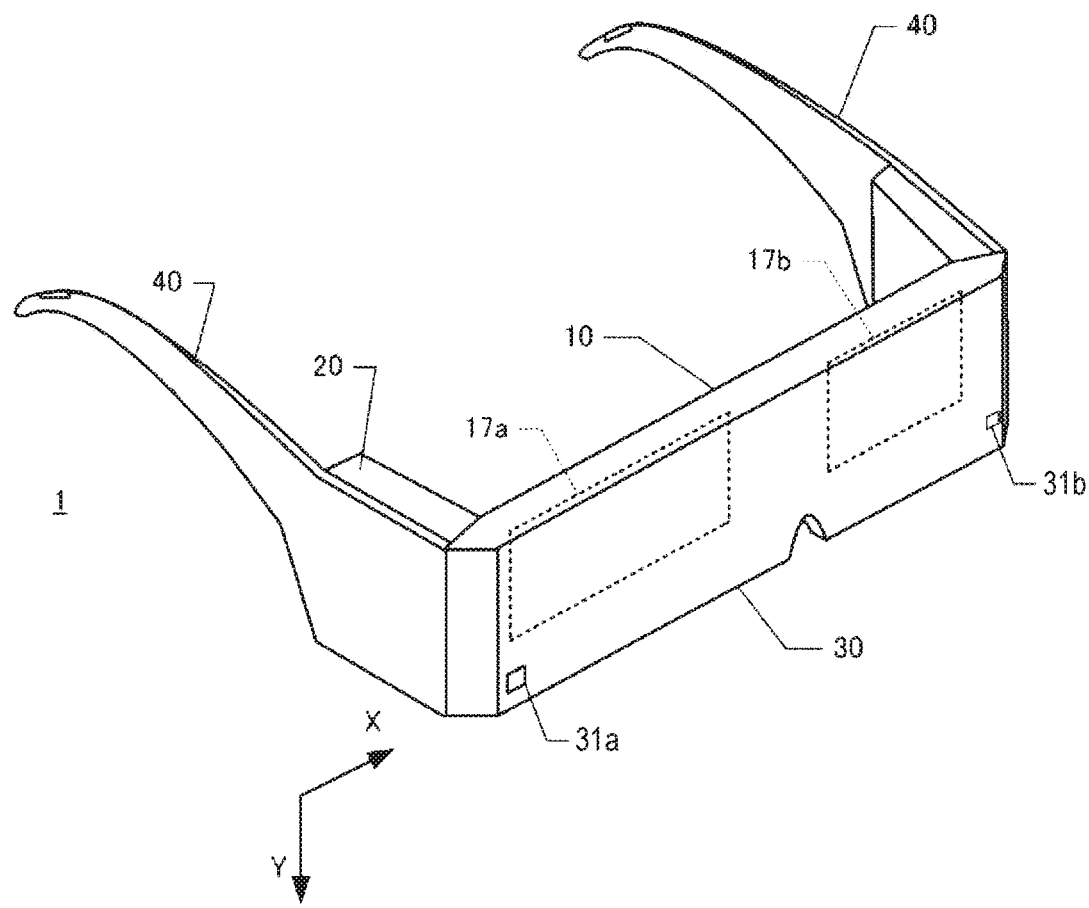
FIG. 1 illustrates an appearance of a head mounted display.
Figure 2:
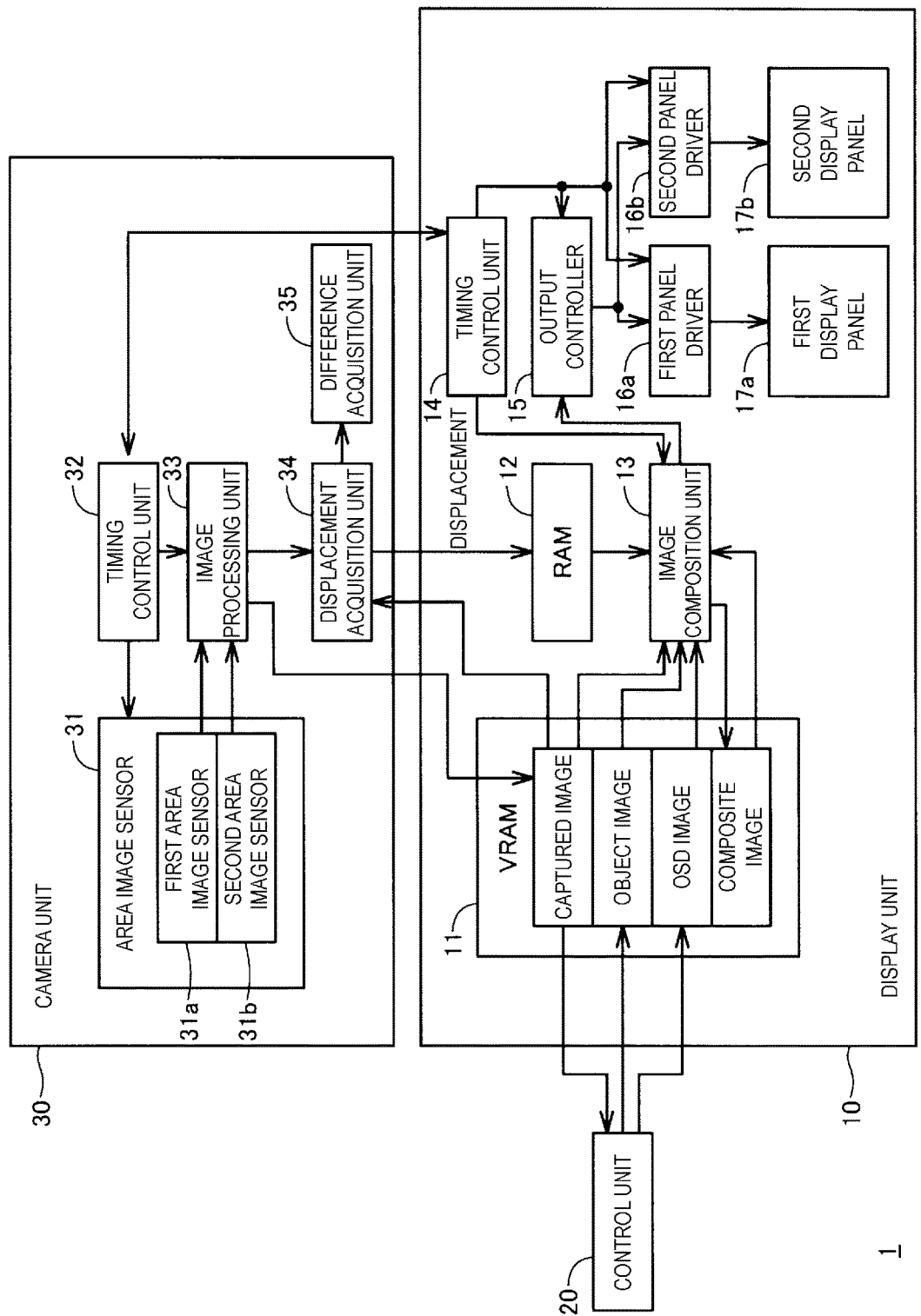
FIG. 2 is a functional block diagram of the head mounted display.

FIG. 1 illustrates an appearance of a head mounted display (HMD) 1, which is a type of display device. FIG. 2 is a functional block diagram of the head mounted display 1. The head mounted display 1 is of a see-through type and is eyeglasses-shaped. A display unit 10 and a camera unit 30 are incorporated in parts corresponding to lenses of the eyeglasses. The parts corresponding to the lenses of the eyeglasses are connected to holding units 40 which are hooked onto a user's ears. A control unit 20 is attached to the holding unit 40.

The display unit 10 includes a VRAM 11, a RAM 12, an image composition unit 13, a timing control unit 14, an output controller 15, a first panel driver 16a, a second panel driver 16b, a first display panel 17a, and a second display panel 17b. Each component of the display unit 10 will be described later.

The camera unit 30 includes an area image sensor 31, a timing control unit 32, an image processing unit 33, a displacement acquisition unit 34, and a difference acquisition unit 35. The camera unit 30 is a detection device. The area image sensor 31 includes a first area image sensor 31a and a second area image sensor 31b. The first area image sensor 31a and the second area image sensor 31b respectively include an optical system and a CMOS sensor.

The optical system is configured to focus light from a subject present in a visual field side of a user wearing the head mounted display 1 onto the CMOS sensor. The CMOS sensor includes a color filter and a plurality of photodiodes and outputs color image data representing an image in the visual field. Each of the plurality of photodiodes stores electrical charge corresponding to light intensity by photoelectric conversion for each pixel.

The first area image sensor 31a is fixed at a right end of a housing of the head mounted display 1. The second area image sensor 31b is fixed at a left end of the housing of the head mounted display 1. The first area image sensor 31a is a sensor configured to mainly output image data in the visual field of the right eye. The second area image sensor 31b is a sensor configured to mainly output image data in the visual field of the left eye. An area for capturing an image of the first area image sensor 31a substantially overlaps with an area for capturing an image of the second area image sensor 31b.

Positions of pixels in the first area image sensor 31a and the second area image sensor 31b are defined by coordinates in a rectangular coordinate system. In the present exemplary embodiment, lines of the first area image sensor 31a are parallel to an x-direction, and thus the lines of the first area image sensor 31a are arrayed in a y-direction. In the present exemplary embodiment, a direction parallel to the lines is referred to as a main scanning direction, and a direction perpendicular to the lines is referred to as a sub scanning direction.

In the present exemplary embodiment, the first area image sensor 31a and the second area image sensor 31b included in the area image sensor 31 operate synchronously with various signals output by the timing control unit 32. In other words, the timing control unit 32 can generate various signals based on a reference clock signal.

In the present exemplary embodiment, various signals includes a vertical synchronizing signal (SVsync) which defines a period of time for reading out detection results of the photodiodes per frame (a picture formed by all pixels of each area image sensor), a horizontal synchronizing signal (SHsync) which defines a period of time for reading out detection results of the photodiodes per line, and a data clock signal (SDotclock) which defines timing for reading out image data of each pixel and the like.

The area image sensor 31 starts to output output data per frame in response to the vertical synchronizing signal SVsync, and, within a period of time defined by the horizontal synchronizing signal SHsync, sequentially reads out the output data representing the detection results of the photodiodes corresponding to the pixels of the first area image sensor 31a and the second area image sensor 31b in a line at a timing in accordance with the data clock signal SDotclock.

In the present exemplary embodiment, the rolling shutter method is employed, and thus each line is exposed at different timings wherein the exposure time is different for each line. The details of this method are as follows. In the first area image sensor 31a according to the present exemplary embodiment, phases of the horizontal synchronizing signals SHsyncs 1 are slightly shifted line-by-line. Also, in the second area image sensor 31b, phases of the horizontal synchronizing signals SHsyncs2 are slightly shifted line-by-line. In other words, in the present exemplary embodiment, the same single line is exposed at the same timing, while the exposure is performed at different timings between the lines adjacent in the sub scanning direction.

It is configured such that, in each of the lines arranged from a line from which the sub scanning begins to a line at which the sub scanning is terminated, the exposure start timing is delayed as the line number increases, and the exposure at each line is sequentially started at different timings. That is, the first area image sensor 31a and the second area image sensor 31b in the present exemplary embodiment are rolling shutter CMOS sensors. The rolling shutter method is also referred to as rolling method. Hereinafter, when distinguishing the signals for the first area image sensor 31a and the second area image sensor 31b, as well as, the signals for the first display panel 17a and the second display panel 17b, signs representing signals are represented with accompanying signs such as 1 or 2.

The image processing unit 33 uses a buffer memory (not illustrated) to perform predetermined image processing on data of a captured image, which is sequentially output on a line-by-line basis from the first area image sensor 31a and the second area image sensor 31b. The image processing in the present exemplary embodiment is a process to display the images captured by the first area image sensor 31a and the second area image sensor 31b on the first display panel 17a and the second display panel 17b, respectively, and includes color reproduction processing, filtering, gamma correction, a resizing process, and the like, for example.

Note that the resizing process is a process to absorb the difference between the number of the pixels in effective regions for capturing an image of the first area image sensor 31a and the second area image sensor 31b and the number of the pixels in effective regions for display of the first display panel 17a and the second display panel 17b, and to change the size of the captured image to a size displayable in the first display panel 17a and the second display panel 17b. Therefore, the captured image output from the image processing unit 33 is an image converted so as to be capable of being displayed on the first display panel 17a and the second display panel 17b.

The processing in the image processing unit 33 is sequentially performed on a line-by-line basis with respect to each of the first area image sensor 31a and the second area image sensor 31b, and the processed data is output to the VRAM 11 included in the display unit 10 (a captured image in the VRAM 11, as illustrated in FIG. 2). A captured image corresponding to a single frame captured at least one frame before and an image being captured in the current frame are stored in the VRAM 11. The data processed by the image processing unit 33 is also output to the displacement acquisition unit 34.

The displacement acquisition unit 34 has a function to detect the change of position of the area image sensor 31 based on an inter-frame difference per line of an image captured by the area image sensor 31, as will be described in detail with reference to FIGS. 3 to 6. In a configuration employed in the present exemplary embodiment, the output from the first area image sensor 31a is configured such that the data processed in the image processing unit 33 is output to the displacement acquisition unit 34.

The difference acquisition unit 35 calculates difference of the change of position, which is acquired by the displacement acquisition unit 34, between blocks, as will be described in detail with reference to FIGS. 3 to 6. The block includes one or more lines. The block in the present exemplary embodiment is constituted of a single line. This difference is a value corresponding to acceleration, as will be described in detail later.

Next, each component of the display unit 10 will be described. The first display panel 17a is disposed such that, in a state where a user wears the head mounted display 1, the visual field of the right eye is obstructed. The second display panel 17b is disposed such that, in a state where a user wears the head mounted display 1, the visual field of the left eye is obstructed. Note that the first display panel 17a and the second display panel 17b are transparent, and thus the user can see external environment through the first display panel 17a and the second display panel 17b.

The VRAM 11 stores an image to be displayed on the first display panel 17a and the second display panel 17b. In the present exemplary embodiment, the VRAM 11 may store a captured image output from the image processing unit 33 (a converted image to be displayed), an object image, which is superimposed on the captured image to provide AR (Augmented Reality) display, an OSD image which is superimposed on the captured image to provide various information to a user, and a composite image obtained by compositing these images.

The data of the object image and data of the OSD image are created in advance and the data of the object image and data of the OSD image to be displayed are stored in the VRAM 11 by the control of the control unit 20. The control unit 20 can perform various processing such as control of the display unit 10 and the camera unit 30 as well as control of output in response to input from an input unit (not illustrated). With respect to the compositing, the control unit 20 selects an object image or an OSD image and the determines positions. The object image is associated with a display position and stored in the VRAM 11 by the control unit 20. When the OSD image is not to be displayed, the data of the OSD image may not be stored.

The RAM 12 stores displacement output from the displacement acquisition unit 34. In the present exemplary embodiment, the control unit 20 determines the display position of the object when the change of position of the first area image sensor 31a is zero. When the change of position of the first area image sensor 31a is not zero, the image composition unit 13 changes the position of the object with respect to the display position to offset the change of position of the first area image sensor 31a.

When the display position of the object is corrected by a reflecting the change of position of the first area image sensor 31a, the image composition unit 13 performs compositing of an object image onto the captured image. As to the compositing, various compositing method may be used as long as the corrected display position of the object is reflected. For example, the compositing can be achieved by sprite function and the like. When the sprite function is utilized, the image composition unit 13 interprets the display position of the object image stored in the VRAM 11 as the corrected display position, and generates composite image data to display the object image superimposed on the captured image.

Note that, in the present exemplary embodiment, the captured image from the first area image sensor 31a is displayed on the first display panel 17a and the captured image from the second area image sensor 31b is displayed on the second display panel 17b. Therefore, each of the captured images from the first area image sensor 31a and the second area image sensor 31b is stored in the VRAM 11, and the image composition unit 13 performs compositing of the object image onto each captured image at the corrected display position of the object. In the present exemplary embodiment, the above described processes are performed on a line-by-line basis sequentially. Note that, when OSD display is needed, the image composition unit 13 also performs processing to superimpose an OSD image at a predetermined position.

In the present exemplary embodiment, the first display panel 17a and the second display panel 17b are Organic Light Emitting Diode (OLED) panels in which a plurality of pixels are formed, wherein the pixel is configured by providing each of white luminous elements with color filters of RGB (red, green, and blue). Therefore, each pixel can perform multi-color display by changing the light emission intensity of each luminous element. Positions of the pixels in the first display panel 17a and the second display panel 17b are also defined by coordinates in a rectangular coordinate system. Further, a plurality of pixels aligned in a direction parallel to one coordinate axis (the x-axis in the present exemplary embodiment) form a line, and a plurality of lines align in a direction parallel to the other coordinate axis (the y-axis in the present exemplary embodiment). In the present exemplary embodiment, the direction parallel to the lines is referred to as the main scanning direction, the direction perpendicular to the lines is referred to as the sub scanning direction, and a picture formed from all the pixels of each panel is referred to as one frame.

The first panel driver 16a and the second panel driver 16b output, to the first display panel 17a and the second display panel 17b, a signal to cause each pixel to emit light at light emission intensity in accordance with composite image data. The first display panel 17a and the second display panel 17b include a main scanning direction driver and a sub scanning direction driver (not illustrated). The main scanning direction driver controls timing of display of each pixel in each line in accordance with the signals output from the first panel driver 16a and the second panel driver 16b, and the sub scanning direction driver drives the luminous elements in each pixel in each line at a designated display timing to perform display.

That is, the first panel driver 16a and the second panel driver 16b are configured to output various signals to perform display on the first display panel 17a and the second display panel 17b, such as a vertical synchronizing signal (DVsync) that defines a period of time for performing display per frame, a horizontal synchronizing signal (DHsync) that defines a period of time for performing display per line, a data active signal (DDactive) that defines a period of time for capturing composite image data in each line, a data clock signal (DDotclock) that defines timing for capturing data of each pixel and the like, and data (Data) of each pixel.

In response to a vertical synchronizing signal DVsync1, the first display panel 17a starts to display a captured image which is captured by the first area image sensor 31a and generated by the image processing unit 33, and performs the display by driving pixels to be displayed in each line of the first display panel 17a at timing in accordance with a data clock signal DDotclock1 within a period of time defined by a horizontal synchronizing signal DHsync1. In response to a vertical synchronizing signal DVsync2, the second display panel 17b starts to display a captured image which is captured by the second area image sensor 31b and generated by the image processing unit 33, and performs the display by driving pixels to be displayed in each line of the second display panel 17b at timing in accordance with a data clock signal DDotclock2 within a period of time defined by a horizontal synchronizing signal DHsync2.

The timing control unit 14 of the display unit 10 is connected to the timing control unit 32 of the camera unit 30. That is, in a case where capturing an image by the camera unit 30 and display by the display unit 10 need to be synchronized, the synchronization can be performed by using a clock signal generated in at least one of the timing control unit 14 and the timing control unit 32 at the other of the timing control unit 14 and the timing control unit 32.

As described above, the first display panel 17a and the second display panel 17b can perform display sequentially on a line-by-line basis. Further, in the present exemplary embodiment, the first area image sensor 31a and the second area image sensor 31b are rolling shutter sensors, and thus the captured images for displaying the captured images in each line are generated at slightly shifted timing. In the present exemplary embodiment, it is configured such that the display can be performed sequentially from the line where the preparation for display has been completed, without waiting for the completion of generating the captured images for one frame.

That is, a K-th line can be displayed when change of position of the first area image sensor 31a based on a captured image in the K-th line is determined, a display position of an object is determined, and compositing of the object image onto the captured image in the K-th line is completed. Thus, the timing control unit 14 sends, to the output controller 15, a signal for indicating the timing at which compositing for the K-th line is completed.

When the output controller 15 receives the indication, the output controller 15 sends an indication to the image composition unit 13, and then the image composition unit 13 acquires the composite image data of the K-th line from the VRAM 11 and outputs the data to the output controller 15. The output controller 15 drives the first panel driver 16a based on the data of the K-th line generated based on the captured image by the first area image sensor 31a, and drives the second panel driver 16b based on the data of the K-th line generated based on the captured image by the second area image sensor 31b. As a result, the first display panel 17a and the second display panel 17b display the image in the K-th line in which the object image is superimposed on the captured image.

Note that any variations of the signal indicating timing at which compositing of the K-th line is completed may be allowed, such as timing after lapse of a certain period of time from the beginning of image-capturing of the K-th line in the first area image sensor 31a and the second area image sensor 31b, or timing at which completion of compositing of the K-th line by the image composition unit 13 is determined. For example, a certain period of time of the former can be defined by a fixed period of time equal to or longer than a period of time needed for processing at the image processing unit 33 or the image composition unit 13. The latter can be achieved by a configuration in which a pulse signal is output from the image composition unit 13 or the like to the timing control unit 14 and the output controller 15 when compositing of each line is completed by the image composition unit 13, for example.

As described above, in the present exemplary embodiment, the change of position of the first area image sensor 31a is detected on a line-by-line basis, and the compositing and displaying of an object is performed in a state where the change of position for each line is reflected.

Figure 3:
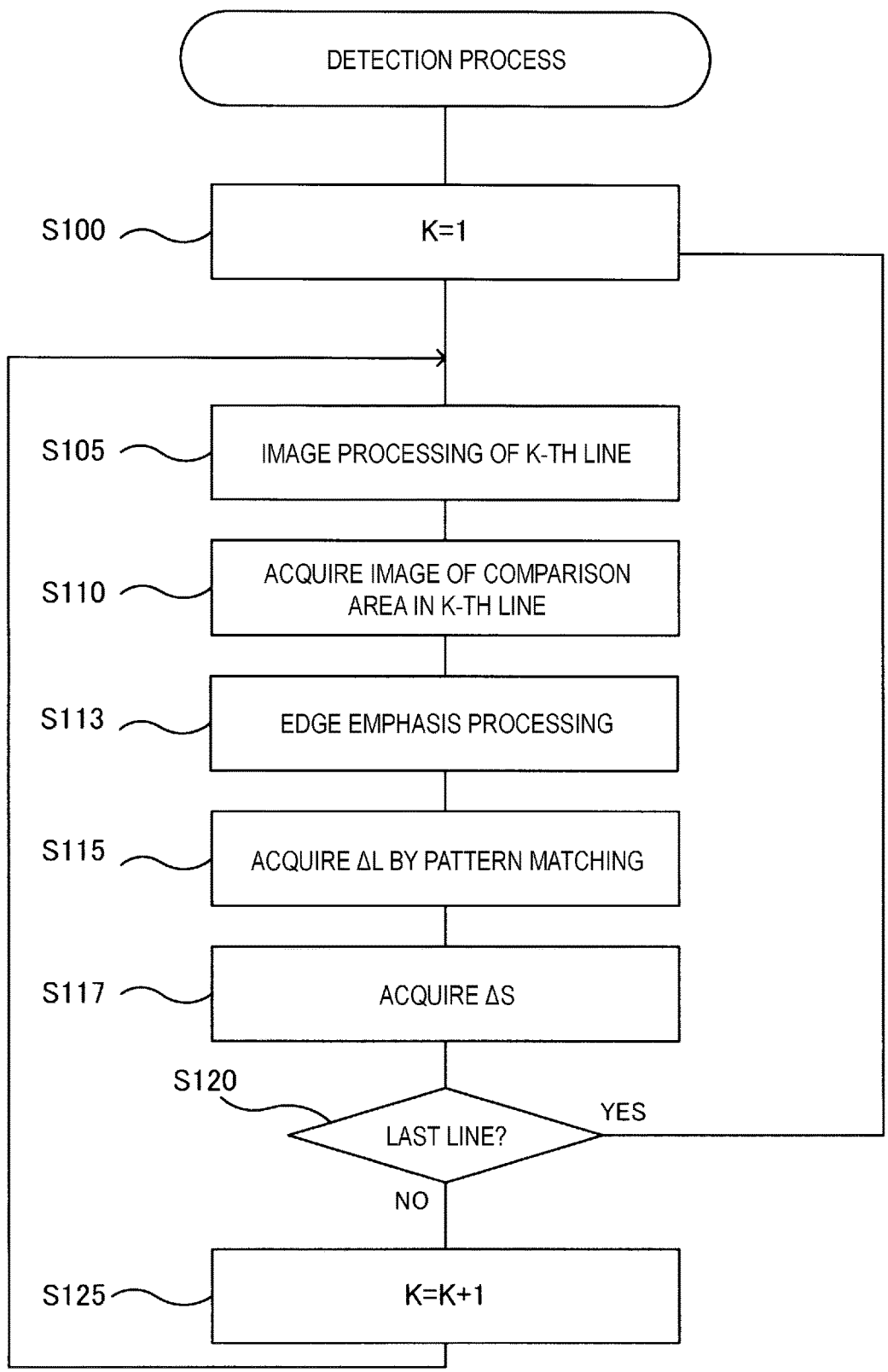
FIG. 3 is a flowchart illustrating a detection process.

FIG. 3 is a flowchart illustrating a detection process. The detection process according to the present exemplary embodiment is a process for acquiring a value corresponding to acceleration in the x-direction of the head mounted display 1 (hereinafter, value corresponding to acceleration ΔS) by using image-capturing by the first area image sensor 31a, as will be described in detail later. The value corresponding to acceleration ΔS means a value obtained by integrating translational motion and rotational motion into one dimensional motion in the main scanning direction of a line, and performing an arithmetic operation corresponding to second order time differentiation, as will be described in detail later.

Figure 4:
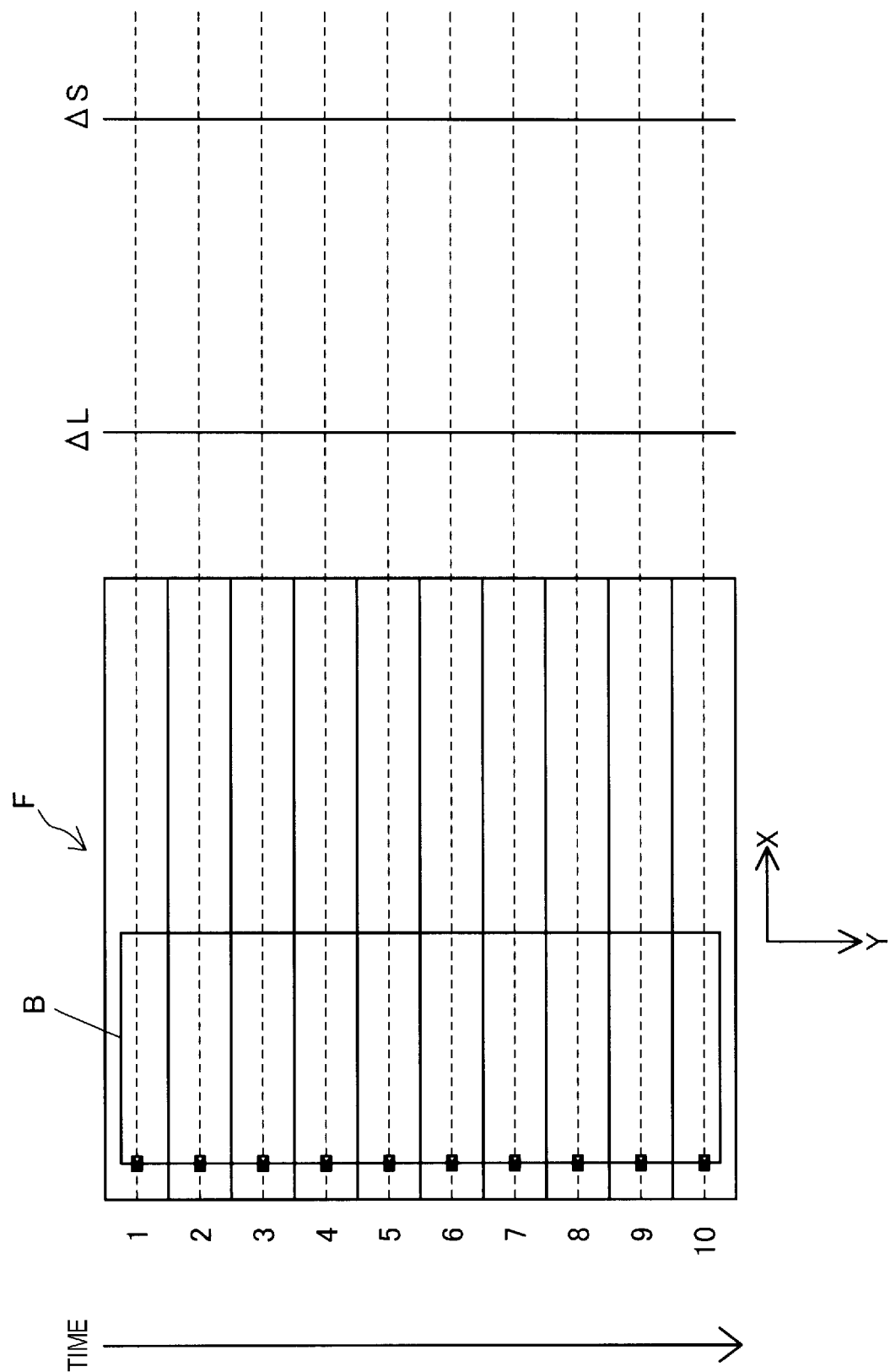
FIG. 4 illustrates a captured image, displacement, and a value corresponding to acceleration.
Figure 5:
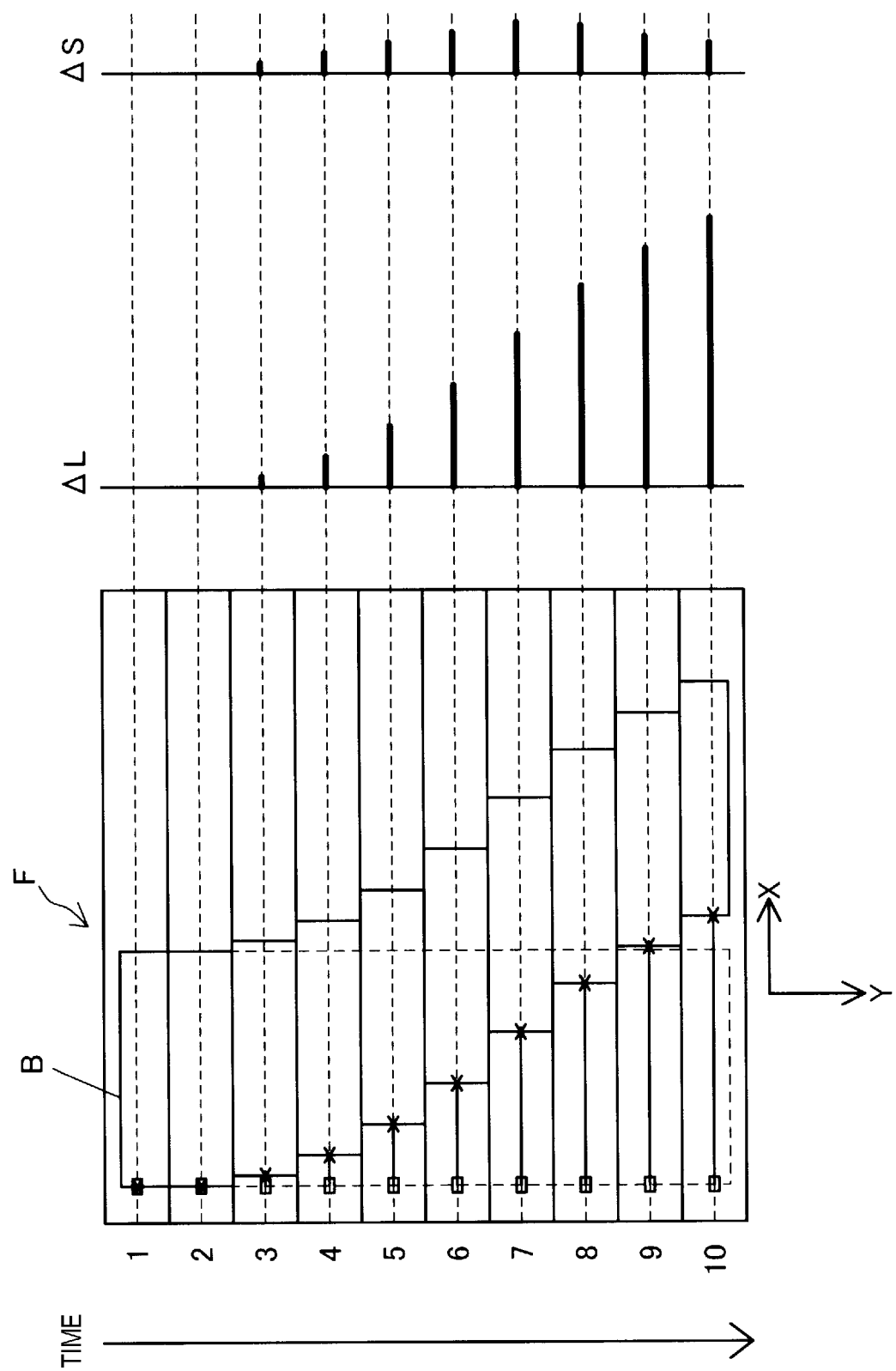
FIG. 5 illustrates a captured image, displacement, and a value corresponding to acceleration.
Figure 6:
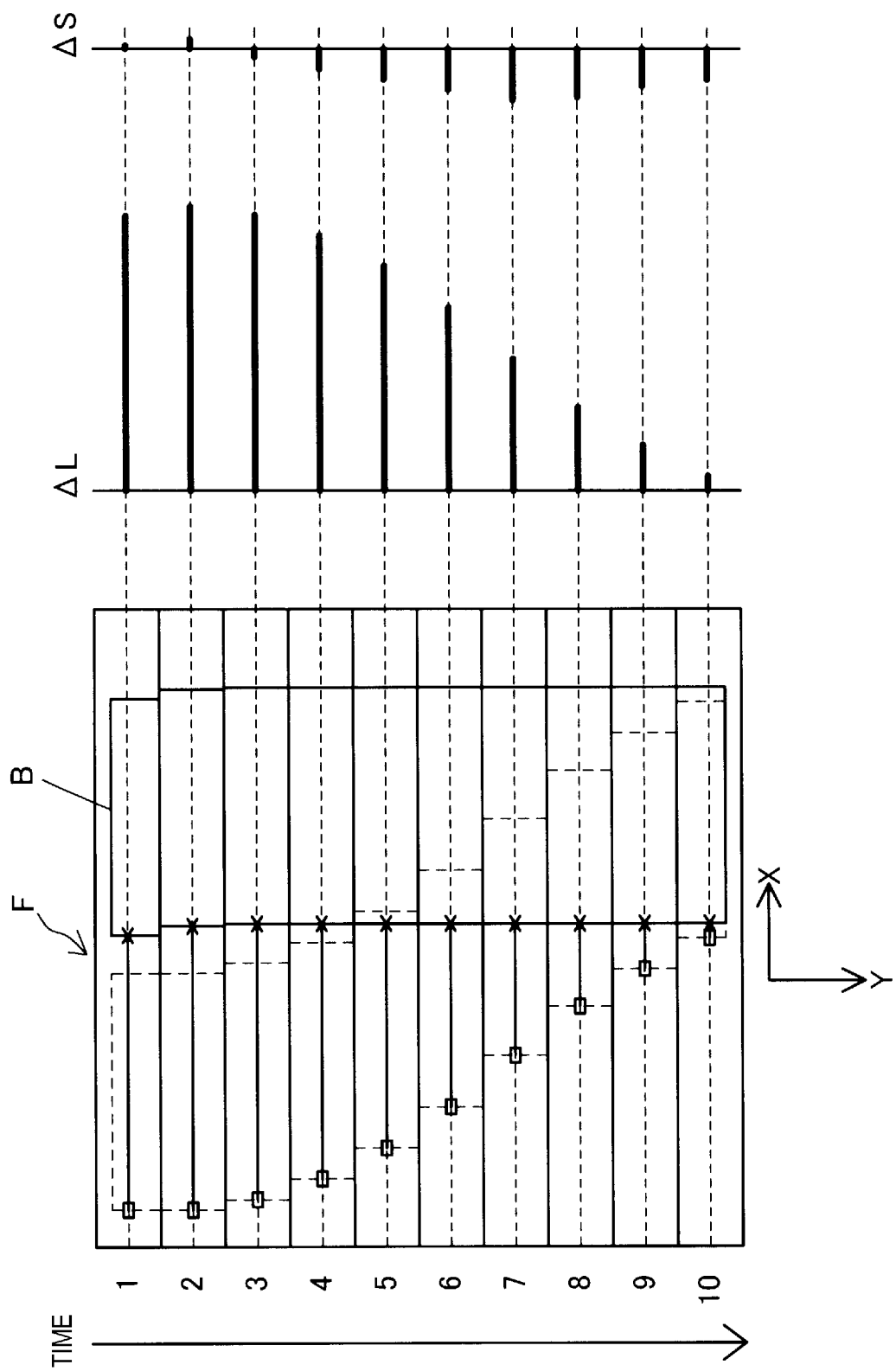
FIG. 6 illustrates a captured image, displacement, and a value corresponding to acceleration.

FIGS. 4 to 6 are figures for describing a specific example of detecting the value corresponding to acceleration ΔS. A frame F in the present exemplary embodiment includes 768 lines. However, it is assumed that a frame F includes 10 lines in FIGS. 4 to 6 in order to simply illustrate the frame F. A number indicated on the left side of each line is the line number.

The frames F illustrated in FIGS. 4 to 6 represent an image captured by the first area image sensor 31a. Any of the frames F illustrated in FIGS. 4 to 6 represents a captured image when the last line (10th line) is completely read out. The frames F illustrated in FIGS. 4 to 6 represent three consecutive frames. Thus, the first line of FIG. 5 is read out subsequently to the reading out of the last line of the frame F illustrated in FIG. 4, and the first line of FIG. 6 is read out subsequently to the reading out of the last line of the frame F illustrated in FIG. 5.

These figures illustrate an example where a rectangular body B exists in the visual field of the first area image sensor 31a. FIG. 4 illustrates an image captured by the first area image sensor 31a in a stationary state. The term "stationary" as used herein means that imaging result of the body B does not change. Thus, "stationary" as used herein means that the first area image sensor 31a is relatively stationary with respect to the body B. Similarly, "the first area image sensor 31a is moving" means that the first area image sensor 31a is relatively moving with respect to the body B. Hereinafter, unless otherwise specified, "stationary" and "moving" mean relative relationship to the body B, as described above.

FIGS. 5 and 6 illustrate images captured while the first area image sensor 31a moves along the main scanning direction (i.e., the x-direction). For example, the situation where the first area image sensor 31a moves in the x-direction occurs when a user wearing the head mounted display 1 rotates his or her head. More precisely, the situation occurs when the user wearing the head mounted display 1 horizontally rotates his or her head to the right or the left. The rotation of the user's head is not actually horizontal movement along the x-direction, but is observed as a movement along the x-direction when the imaging result of the body B is used as a reference.

In a case where the time when the last line in FIG. 5 is read out is defined as the current time (hereinafter, referred to as "time of FIG. 5", the same applies to FIGS. 4 and 6), the frame F of FIG. 5 is referred to as the current frame, and the frame F of FIG. 4 is referred to as the previous frame. Similarly, when the time of FIG. 6 is defined as the current time, the frame F of FIG. 6 is referred to as the current frame, and the frame F of FIG. 5 is referred to as the previous frame. In FIGS. 5 and 6, the current frame is represented by a solid line, and the previous frame is represented by a dotted line. Note that the current frame and the previous frame are identical in FIG. 4, and thus the previous frame is not illustrated.

When the first area image sensor 31a is moving, images are captured while reflecting the change of position due to the movement, since the exposure start timing of each line is shifted by the rolling shutter method. In FIG. 5, the first area image sensor 31a is stationary at image-capturing stages of lines of which the exposure start timing is earlier. Thereafter, the first area image sensor 31a starts to move, and thus the rectangular body in the captured image are distorted because the movement is reflected. FIG. 6 illustrates a state after the state of FIG. 5 and the movement of the first area image sensor 31a is terminated at the time of FIG. 6.

When the detection process is started, the image processing unit 33 initializes the line number K to 1 (S100). Next, the image processing unit 33 performs image processing of the K-th line (S105). That is, when the first area image sensor 31a outputs data corresponding to a single line, the image processing unit 33 executes color reproduction processing, filtering, gamma correction, resizing process, and the like to each line output. When S105 is executed, the captured image is converted into the image for display and is stored in the VRAM 11. The display unit 10 may display the image obtained in S105, but this will not be described in detail in the present exemplary embodiment.

Next, the image processing unit 33 acquires an image processing result of the K-th line in the previous frame (S110). The VRAM 11 retains at least a captured image of the previous frame. When the data of the converted captured image of the K-th line is stored in the VRAM 11, if an image captured 2 frames before exists, the data of the K-th line obtained 2 frames before is discarded. The timing of discarding the data may vary depending on the capacity of the VRAM 11. For example, if the capacity of the VRAM 11 is large, a configuration in which an image captured 3 frames before (if it exists) is discarded may be employed.

Next, the displacement acquisition unit 34 performs edge emphasis processing to the captured image (S113). Hereinafter, the edge emphasized image is referred to as edge image.

Next, the displacement acquisition unit 34 acquires displacement ΔL on a block-by-block basis by using pattern matching, and outputs the displacement ΔL (S115). The displacement acquisition unit 34 moves, in the x-direction, the edge image in the K-th line of the previous frame and acquires difference between the gradation value of the moved edge image and the gradation value of edge image in the K-th line of the current frame. Further, the displacement acquisition unit 34 acquires displacement ΔL in the x-direction when the difference is minimized. The displacement ΔL is acquired with pixel being used as the unit. In this way, one line is considered as one block in the present exemplary embodiment.

In the example illustrated in FIGS. 4 to 6, the edge of the body B on the minus side in the x-direction is considered as the position of the body B. X marks represent positions in the current frame, and square marks represent positions in the previous frame.

For example, the image in the example illustrated in FIG. 4 is captured when the first area image sensor 31a is stationary, and thus positions of the edges in the current frame are identical to positions of the edges in the previous frame, respectively. Therefore, the displacement ΔL of any line is zero, as illustrated in FIG. 4.

In the example illustrated in FIG. 5, in the third and following lines, the edges in the current frame are positioned on the plus side in the x-direction with respect to the edges in the previous frame. Further, in the third and following lines, the edges in the current frame shifts further to the plus side in the x-direction, as K increases (i.e., K approaches 10th line). This reflects that the first area image sensor 31a continuously moves toward the same direction after the exposure time of the third line.

In the example illustrated in FIG. 6, in the third to 10th lines, positions of the edges in the current frame are the same in the x-direction. This reflects that the movement of the first area image sensor 31a stops at the exposure time of the third line.

Next, the difference acquisition unit 35 detects a value corresponding to acceleration ΔS (S117). A value corresponding to velocity will be described prior to describing the value corresponding to acceleration ΔS. The above described displacement ΔL is a parameter with the number of pixels being used as the unit, but it is a parameter substantially indicating the value corresponding to velocity. This is because, in terms of the same line, time difference between the current frame and the previous frame is determined by a frame rate (frame/second), and thus displacement per second (pixel/second) is obtained by (displacement ΔL×frame rate). The frame rate is constant, and thus the value of displacement ΔL in itself can be considered as a value corresponding to velocity.

The reason why the value is referred to as the value corresponding to velocity is that the movement of the body B in the x-direction may be caused by either one or both of translational motion and rotational motion. Therefore, unlike the dimension of velocity of translational motion (m/second) and the dimension of angular velocity (rad/second), the dimension of the value corresponding to velocity is pixel/second. In this way, in the present exemplary embodiment, the term "value corresponding to velocity" is used to indicate that the value is not always expressed as exactly the same type of physical quantity as velocity of translational motion and angular velocity. The term "the value corresponding to acceleration" is also based on the same background.

When the displacement ΔL is considered as a value corresponding to velocity, as described above, the value corresponding to acceleration ΔS can be calculated by performing, to the displacement ΔL, an arithmetic operation corresponding to time differentiation. The difference acquisition unit 35 according to the present exemplary embodiment performs the above described calculation using the following equation: $\Delta S = \Delta L_K - \Delta L_{K-1}$. $\Delta L_K$ is displacement ΔL in the K-th line and $\Delta L_{K-1}$ is displacement ΔL in the (K−1)th line. When K=1, the last line (10th line in the illustrated example) is considered as (K−1)th line. The difference acquisition unit 35 sequentially acquires $\Delta L_K$ from the displacement acquisition unit 34 to perform the above described calculation.

ΔS obtained from the above described calculation represents a change amount of the displacement ΔL (i.e., a value corresponding to velocity) within a time between the exposure of (K−1)th line and the exposure of the K-th line. Therefore, ΔS can be considered as a value corresponding to acceleration (pixel/second$^2$). Note that, in the present exemplary embodiment, the frame rate is 60 fps and the number of lines is 768. When 60 fps is expressed in terms of cycle, it is represented as 16.6 ms per frame. Thus, the cycle of outputting ΔS is 16.6 ms/768=21.7 μs.

Next, the image processing unit 33 determines whether the line number K is the number of the last line or not (S120). When the line number K is not the number of the last line, the image processing unit 33 increments K (S125), and repeats S105 and following steps. When determining the line number K is the number of the last line in S120, the image processing unit 33 repeats S100 and following steps.

According to the present exemplary embodiment, the value corresponding to acceleration ΔS can be acquired by using the above described simple calculation and at 21.7 μs cycle which is significantly shorter than a time period taken for one frame. Further, the unit of the value corresponding to acceleration ΔS is pixel, and thus it provides high spatial resolution and high time resolution (21.7 μs).

The value corresponding to acceleration ΔS can be considered as a value representing relative motion of the first area image sensor 31a with respect to the body B. Therefore, by using the value corresponding to acceleration ΔS, it is possible to acquire the value corresponding to acceleration of the first area image sensor 31a at a short cycle and with higher accuracy as compared to gyroscope sensor and the like. It is possible to consider that the value corresponding to acceleration of the first area image sensor 31a is equal to that of the head mounted display 1, since the first area image sensor 31a is fixed on the head mounted display 1.

Further, in contrast to gyroscope sensors, the value corresponding to acceleration ΔS does not accumulate errors due to integration and is not easily affected by thermal change. Therefore, the value corresponding to acceleration can be acquired with higher accuracy as compared to gyroscope sensor and the like.

The present disclosure is not limited to the exemplary embodiments and examples described herein, but may be implemented in various configurations without departing from the spirits of the present disclosure. For example, appropriate replacements or combinations may be made to the technical features in the exemplary embodiments and examples which correspond to the technical features in the embodiments described in the Summary section to achieve a part or all of the above-described advantage or to achieve a part or all of the above-described advantageous effects. Any of the technical features may be deleted as appropriate unless the technical feature is described herein as indispensable. For example, the following exemplary embodiments can be exemplified.

The display device including a mechanism for acquiring the above described value corresponding to acceleration ΔS is not limited to the see-through type head mounted display 1, and thus the display device may include video see-through type, closed-type (for Virtual Reality application) head mounted displays, and the like. Alternatively, the display device may include display devices other than head mounted displays, such as smartphones and tablet terminals as well as robots including a display device.

The detection device serving as a camera unit may not be provided integrally with the display device, i.e., the detection device may be provided separately.

The previous frame upon the calculation of the displacement ΔL may not be the frame captured one frame before the current frame, and thus the previous frame may be a frame captured 2 or more frames before.

One block upon the calculation of the displacement ΔL may not be a single line, and thus one block may include 2 or more lines.

When the value corresponding to acceleration ΔS is calculated, the K-th line may not be compared with (K−1)th line, and thus the K-th line may be compared with (K−q)th (q is an integer n equal to or greater than 2) line.

The main scanning direction of the area image sensor used in the detection process may not be parallel to the x-direction, and thus the main scanning direction of the area image sensor may be parallel to the y-direction, for example.

Thus, the second area image sensor 31b may be used to obtain the value corresponding to acceleration ΔS in the y-direction. Further, the first area image sensor 31a and the second area image sensor 31b may be used to obtain the values corresponding to acceleration ΔS in the x-direction and the y-direction, respectively. Alternatively, the area image sensor may be disposed such that the main scanning direction is a direction which is not parallel to the x-direction and the y-direction, so as to obtain the value corresponding to acceleration ΔS in the direction.

In the above-described exemplary embodiments, a part or all of the functions and processing implemented by software may be implemented by hardware. Furthermore, a part or all of the functions and processing implemented by hardware may be implemented by software. The hardware may be, for example, any of various circuits such as an integrated circuit, a discrete circuit, or a circuit module with a combination of integrated circuits or discrete circuits.

The lines of the second area image sensor 31b may be parallel to the y-direction. Thus, the lines of the second area image sensor 31b may be perpendicular to the lines of the first area image sensor 31a. In this case, the lines of the second area image sensor 31b are arrayed in the x-direction. Alternatively, the lines of the second area image sensor 31b may be not parallel to either of the x-direction and the y-direction.

The entire disclosure of Japanese Patent Application No. 2017-245838, filed Dec. 22, 2017 is expressly incorporated by reference herein.

What is claimed is:

1. A detection device, comprising:
an area image sensor configured to capture an image of a subject by using a rolling method in which an image is acquired sequentially from a first block to an n-th block on a block-by-block basis, each block including one or more lines, the n being an integer equal to or greater than 2;
a displacement acquisition unit configured to:
compare an image of an m-th block included in a first frame captured by the area image sensor with an image captured in the m-th block included in a second frame captured after the first frame to acquire displacement of the image with respect to a main scanning direction of the line, the m being a positive integer equal to or less than the n; and
compare an image of a p-th block included in the first frame with an image captured in the p-th block included in the second frame to acquire displacement of the image with respect to the main scanning direction, the p being a positive integer equal to or less than the n and the m≠the p; and
a difference acquisition unit configured to acquire, as a value corresponding to acceleration of the area image sensor with respect to the subject, difference between the displacement acquired in the m-th block and the displacement acquired in the p-th block.

2. The detection device according to claim 1, wherein the second frame is a frame next to the first frame.

3. The detection device according to claim 1, wherein the p is a value obtained by adding 1 to the m.

4. The detection device according to claim 1, wherein the block is constituted of a single line.

5. The detection device according to claim 1, wherein the displacement acquisition unit is configured to use edge emphasis processing for the comparison.

6. A display device comprising the detection device according to claim 1.

7. A detection method by using an area image sensor configured to capture an image of a subject by using a rolling method in which an image is acquired sequentially from a first block to an n-th block on a block-by-block basis, each block including one or more lines, the n being an integer equal to or greater than 2, the detection method comprising:

comparing an image of an m-th block included in a first frame captured by the area image sensor with an image captured in the m-th block included in a second frame captured after the first frame to acquire displacement of the image with respect to a main scanning direction of the line, the m being a positive integer equal to or less than the n;

comparing an image of a p-th block included in the first frame with an image captured in the p-th block included in the second frame to acquire displacement of the image with respect to the main scanning direction, the p being a positive integer equal to or less than the n and the m≠the p; and acquiring, as a value corresponding to acceleration of the area image sensor with respect to the subject, difference between the displacement acquired in the m-th block and the displacement acquired in the p-th block.

8. A detection device, comprising:

a camera configured to capture an image of a subject by using a rolling method in which an image is acquired sequentially from a first block to an n-th block on a block-by-block basis, each block including one or more lines, the n being an integer equal to or greater than 2;

a processor configured to:

compare an image of an m-th block included in a first frame captured by the camera with an image captured in the m-th block included in a second frame captured after the first frame to acquire displacement of the image with respect to a main scanning direction of the line, the m being a positive integer equal to or less than the n;

compare an image of a p-th block included in the first frame with an image captured in the p-th block included in the second frame to acquire displacement of the image with respect to the main scanning direction, the p being a positive integer equal to or less than the n and the m≠the p; and acquire, as a value corresponding to acceleration of the camera with respect to the subject, difference between the displacement acquired in the m-th block and the displacement acquired in the p-th block.

\* \* \* \* \*